A. F. RIPPEL.
SMOKING PIPE.
APPLICATION FILED JAN. 30, 1912.
1,061,009.
Patented May 6, 1913.
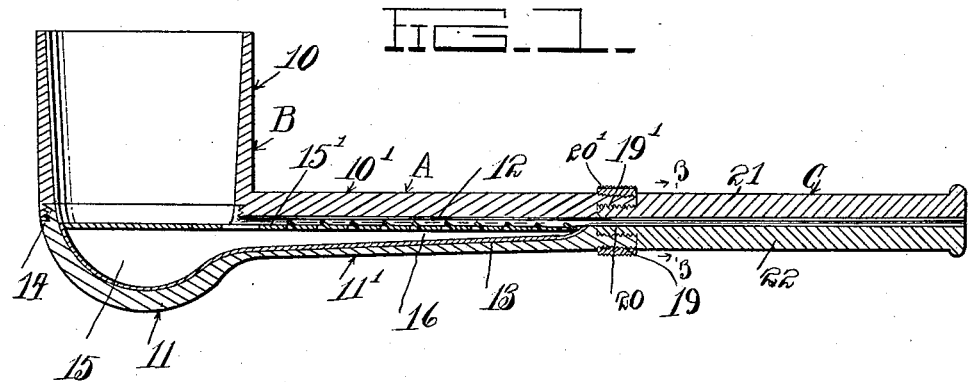
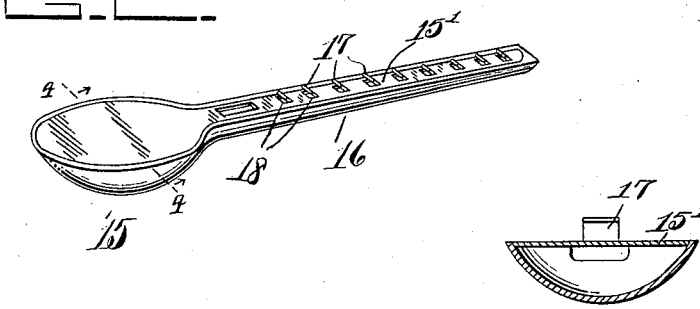
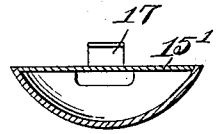
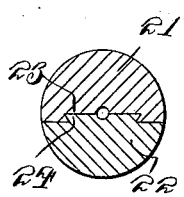
Inventor
A. F. Rippel.
Witnesses
By
Attorneys

UNITED STATES PATENT OFFICE.

ALBERT F. RIPPEL, OF GREENWICH, CONNECTICUT.

SMOKING-PIPE.

1,061,009.  Specification of Letters Patent.  Patented May 6, 1913.

Application filed January 30, 1912. Serial No. 674,265.

*To all whom it may concern:*

Be it known that I, ALBERT F. RIPPEL, a citizen of the United States, residing at Greenwich, in the county of Fairfield, State of Connecticut, have invented certain new and useful Improvements in Smoking-Pipes; and I do hereby declare the following to be a full, clear, and exact description of the invention, such as will enable others skilled in the art to which it appertains to make and use the same.

This invention relates to smoking pipes.

The object of the invention resides in the provision of a pipe constructed of separate parts which may be easily and quickly disassociated from each other so as to facilitate the cleaning of the pipe.

A further object of the invention resides in the provision of a pipe which includes as a component part thereof a trap adapted to catch and retain nicotin and saliva as it accumulates in the draw channel of the stem, so as to prevent the passage of such nicotin and saliva into the mouth of the user.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1 is a longitudinal section through a pipe constructed in accordance with the invention, Fig. 2, a detail perspective view of the trap for catching and holding nicotin and saliva accumulating in the stem, Fig. 3, a cross section through the mouth piece of the pipe on the line 3—3 of Fig. 1, and Fig. 4, a section on the line 4—4 of Fig. 2.

Referring to the drawing, the pipe is shown as comprising a stem portion A, a bowl B and a mouth piece C. The bowl B and stem A are each shown as formed of top and bottom sections with the corresponding sections of the bowl and stem formed integral with each other. The top sections of the bowl and stem are indicated at 10 and 10' respectively while the bottom sections of said bowl and stem are indicated at 11 and 11' respectively. The stem sections 10' and 11' are provided with interiorly disposed longitudinal grooves which mate when said sections are assembled and form a draw channel 12. This draw channel is provided with an enlarged lower portion 13 opening into the interior of the base section 11 of the bowl for a purpose that will presently appear.

The base section 11 of the bowl is provided with a reduced threaded upper portion 14 upon which is adapted to be screwed the top section 10 of the bowl. It will be here noted that the threads of the portion 14 and the top section 10 are so arranged that when said top section 10 is screwed home the stem sections 10' and 11' will be disposed in mating relation. Seated in the base section 11 of the bowl is a trap 15 provided with a stem 16 extending into the enlarged portion 13 of the draw channel 12. This trap includes a removable cover 15' by means of which the upper end of both the body of the trap and the stem 16 is adapted to be closed and which will permit said trap to be filled with a fresh supply of absorbent material at intervals. The lower side of the stem 16 is inclined toward the body of the trap, while the cover 15' has struck from its stem portion a plurality of tongues 17 which are bent upwardly and outwardly to form openings 18, said tongues when so bent serving as deflector plates to direct the accumulated saliva drawn by suction from the bowl into the stem 16. The deflecting tongue of the innermost opening 18 is removed and said opening is made relatively larger than the remaining openings 18 so that when the pipe is not in use any saliva in the stem of the pipe which may flow toward the bowl would pass into the trap through said innermost opening 18. The free end of the stem A is recessed as at 19' and threaded in this recess is the reduced end 20 of the mouth piece C. The mouth piece C is additionally secured to the stem A by means of a band 19 screwed upon the stem A in overlapping relation to the recess 19'. This band serves to clamp the outer end of the stem A upon the adjacent end of the mouth piece C. The outer face of the band 19 is roughened as at 20' to form a suitable gripping surface for facilitating the screwing of said band upon the stem A. The mouth piece C is formed of two sections 21 and 22, the former of which is provided with a dove-tailed longitudinal groove 23, while the latter is provided with a dove-tailed longitudinal tongue 24 adapted to enter said groove and secure the sections 21 and 22 together.

From the foregoing it will be apparent that there has been provided a pipe composed of a plurality of sections which may be easily disassociated from each other for the purposes of cleaning, while the trap-structure heretofore described serves to efficiently prevent the passage of saliva and nicotin into the mouth of the user.

What is claimed is:

1. A smoking pipe comprising a bowl and a stem provided with a draw channel passing through the stem and communicating with the interior of the bowl, a receptacle seated in the bottom of the bowl and having a stem extending into the draw channel, said stem being provided with openings affording communication between the interior thereof and the draw channel, and a plurality of deflector plates carried by the stem forward of each opening and inclined toward the bowl and projecting into the draw channel exteriorly of the stem.

2. A smoking pipe comprising a bowl and a stem provided with a draw channel passing through the stem and communicating with the interior of the bowl, a receptacle seated in the bottom of the bowl and having a stem extending into the draw channel, said stem and receptacle having open top portions, a plate removably seated over the open top portion of the receptacle and the stem portion of said plate being provided with openings affording communication between the interior thereof and the draw channel and a plurality of deflector plates carried by the stem portion of the plate forward of each opening and inclined toward the bowl and projecting into the draw channel.

In testimony whereof, I affix my signature, in presence of two witnesses.

ALBERT F. RIPPEL.

Witnesses:
   FRED W. BRUNNER,
   WILLIAM A. BRIDGE.

---

Copies of this patent may be obtained for five cents each, by addressing the "Commissioner of Patents, Washington, D. C."